Oct. 30, 1956  W. J. MORRILL  2,768,863
REVERSIBLE LUBRICATING SYSTEM
Filed May 13, 1954  2 Sheets-Sheet 1

INVENTOR.
WAYNE J. MORRILL
BY Woodling & Kroot
attys.

Oct. 30, 1956   W. J. MORRILL   2,768,863
REVERSIBLE LUBRICATING SYSTEM
Filed May 13, 1954   2 Sheets-Sheet 2

INVENTOR.
WAYNE J. MORRILL
BY Woodling & Kroat
attys.

United States Patent Office 2,768,863
Patented Oct. 30, 1956

2,768,863

REVERSIBLE LUBRICATING SYSTEM

Wayne J. Morrill, Garrett, Ind.

Application May 13, 1954, Serial No. 429,525

3 Claims. (Cl. 308—132)

My invention relates in general to lubricating systems and more particularly to lubrication by means of a shaft.

An object of my invention is to provide a shaft for transmitting lubricant to one or more bearings.

Another object of my invention is to provide a shaft for transmitting lubricant to a bearing regardless of the rotational direction of the shaft.

Another object of my invention is to provide a sleeve bearing which is more readily adaptable to receive lubricant from a shaft which is supplying the lubricant.

Another object of my invention is to provide a lubricating system which will be operable regardless of the direction in which the shaft is rotating to supply lubricant to one or more bearings.

Another object of my invention is to provide a unique method of transmitting lubricant from a lubricant supply source by means of a wick or a shaft and thereby to a bearing.

Another object of my invention is the provision of producing grooves upon the surface of a shaft which grooves generate opposite paths and which grooves transmit lubricant in one axial direction regardless of the rotation of the shaft.

Other objects and a fuller understanding of this invention may be had by referring to the following description and claims, taken in conjunction with the accompanying drawings, in which:

Figure 1:
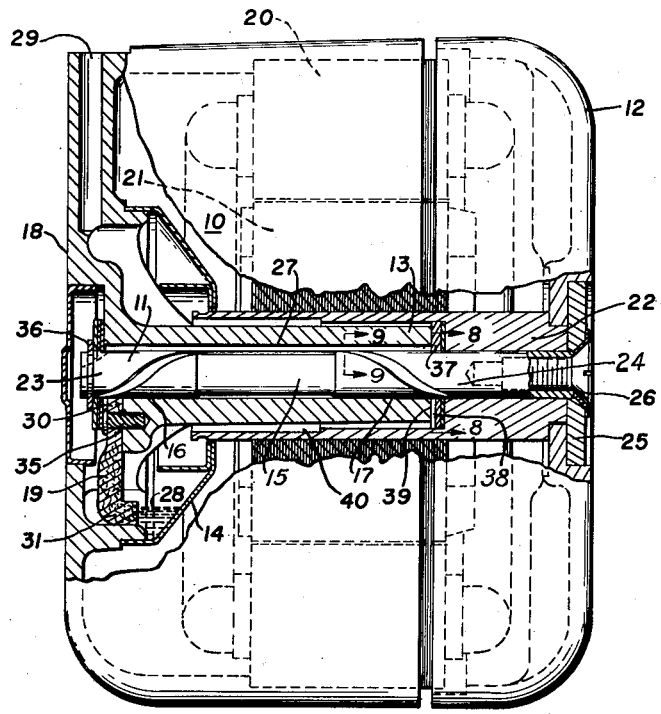
Figure 1 is a cross-sectional elevation view of my invention as incorporated within a fan motor housing.
Figure 2:
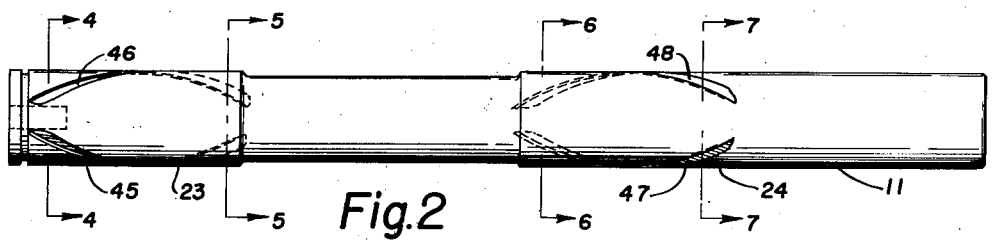
Figure 2 is an enlarged plan view of the main shaft shown in Figure 1.
Figure 3:
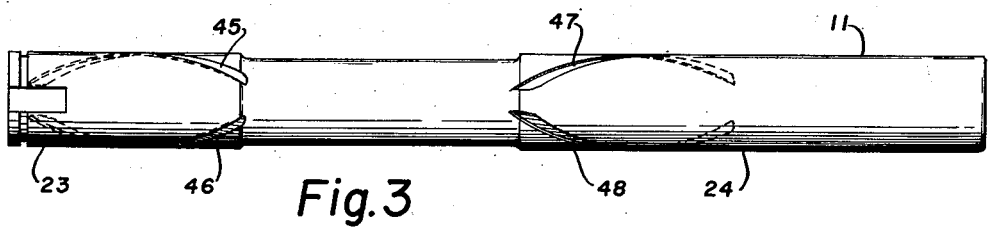
Figure 3 is a view of the shaft shown in Figure 2 rotated through one hundred eighty degrees.
Figure 4:
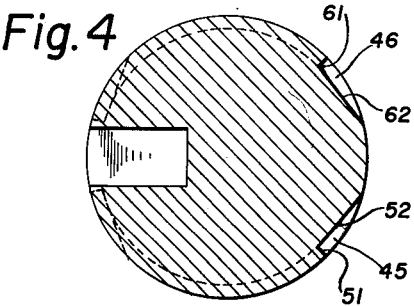
Figure 4 is an enlarged cross-sectional view taken along the lines 4—4 of Figure 2.
Figure 5:
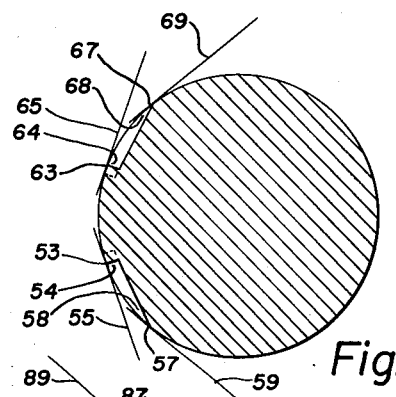
Figure 5 is an enlarged cross-sectional view taken along the lines 5—5 of Figure 2.
Figure 6:
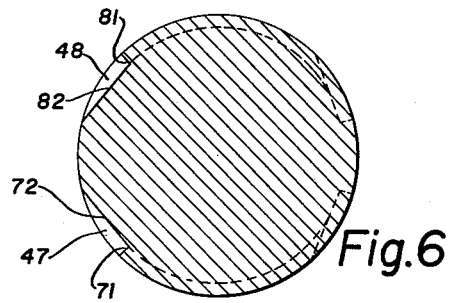
Figure 6 is an enlarged cross-sectional view taken along the lines 6—6 of Figure 2.
Figure 7:
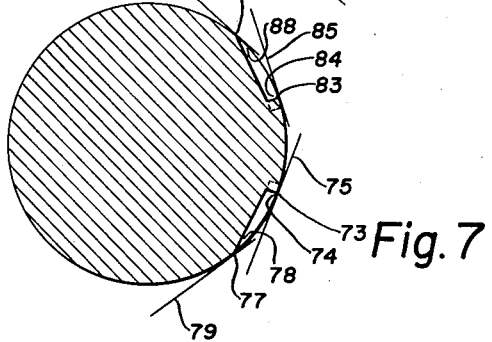
Figure 7 is an enlarged cross-sectional view taken along the lines 7—7 of Figure 2.

With reference to Figure 1, I show a motor indicated generally at 10 having a main shaft 11. A rotatable fan blade carrier 12 is mounted upon one end of the shaft 11. The main shaft 11 is adapted to be received within a bearing 13. A lubricant reservoir 14 is provided in a housing 18; and a wick 19 extends into the lubricant reservoir 14 at one portion, while the other portion engages the main shaft 11.

Figure 9:
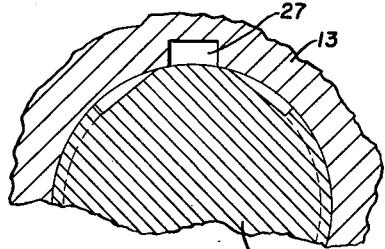
Figure 9 is an enlarged view taken along lines 9—9 of Figure 1.

The motor 10 has a stator 20 and a rotor 21. The rotor 21 is mounted on a hollow shield 22 which is concentric with the bearing 13 and the main shaft 11. The hollow shield 22, the rotatable fan blade carrier 12, and the main shaft 11 are secured together for rotational movement by means of a retaining washer 25 and a flat head cap screw 26. The main shaft 11 has a first and a second end portion designated by the numerals 23 and 24, respectively, formed by machining a third or center portion of the shaft 11 to a smaller diameter which provides a hollow lubricant storage space or well indicated by the reference numeral 15 and also provides the bearing 13 with first and second bearing portions indicated by the reference numerals 16 and 17, respectively. The second end portion of the shaft 11 is tapped by suitable means to receive the cap screw 26. The bearing 13 is formed as an integral part of the housing 18 upon casting of the housing and is later machined to give the proper tolerances for receiving the greater portion of the main shaft 11. The inner surface of the bearing is constructed to produce a slot 27 across the upper surface of the bearing as illustrated in Figure 1 and as seen more clearly in Figure 9.

A lubricant reservoir 14 containing a lubricant 28 is attached to the housing 18 by suitable means such as welding. An inlet channel 29 is provided in the housing wall to admit the lubricant 28 to the reservoir 14.

Figure 8:
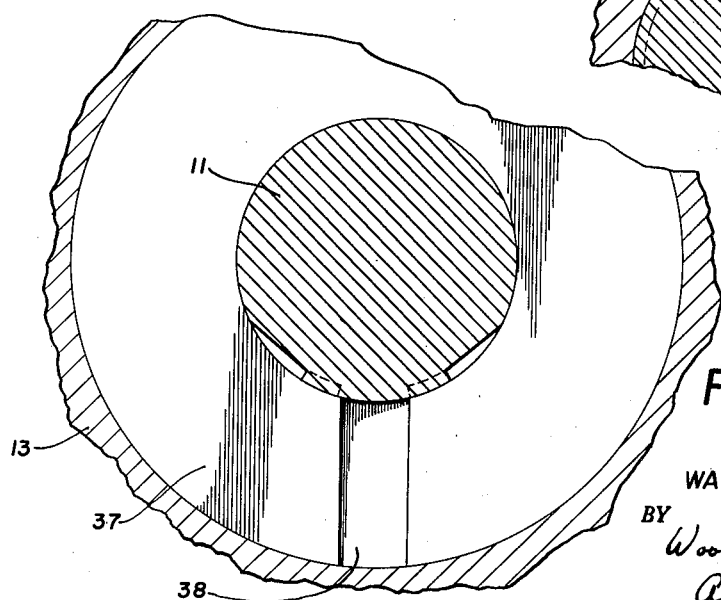
Figure 8 is an enlarged view of the brass washer illustrated in Figure 1 taken along lines 8—8 of Figure 1.

The wick 19 having first and second portions indicated by the numerals 30 and 31, respectively, is adapted to have its first portion engage the main shaft 11 and its second portion engage the lubricant 28. The wick 19 is held in position to press against the shaft 11 by suitable means such as a pin 35. A snap ring 36 is adapted to engage the shaft 11 at its first end portion 23 to secure it from horizontal movement. A brass washer 37 having a slot 38 on its face, indicated clearly in Figure 8, is adapted to engage an end surface 39 of the bearing 13.

The hollow shield 22 is machined to produce a clearance between the bearing 13 and the hollow shield 22. This clearance forms a passageway from the end of the bearing 13 to the lubricant reservoir 14 and is indicated generally by the reference numeral 40.

In Figures 2, 3, 4, 5, 6 and 7, the shaft 11 is shown in greater detail. Upon the first end portion of the shaft 11 are constructed first and second grooves or depressions indicated by the reference numerals 45 and 46, respectively. Upon the second end portion are constructed first and second grooves indicated by the reference numerals 47 and 48, respectively. The grooves 45 and 46 are spirally disposed along the first end portion of the shaft 11 and annularly spaced from each other, and the grooves 47 and 48 are spirally disposed on the second end portion of the shaft and are annularly spaced from each other. The groove 45 is defined by first and second wall surfaces or portions indicated by the reference numerals 51 and 52, respectively, and describes a helical path in a clockwise direction with the shaft 11. The first wall surface 51 meets with the circumference of the shaft 11 at a first point 53 and defines a first groove angle indicated by the reference numeral 54 with a tangent 55 to the shaft 11 which is drawn through said first point 53. The second wall surface 52 meets with the circumference of the shaft 11 at a second point 57 and defines a second groove angle indicated by the reference numeral 58 with a tangent 59 to the shaft 11 which is drawn through said second point 57. The first groove angle 54 of the groove 45 is at all times larger than the second groove angle 58 of the groove 45. The first wall surface 51 of groove 45 at all times faces the counterclockwise direction of rotation of the main shaft 11 and the second wall surface of groove 45 at all times faces opposite the counterclockwise direction of rotation of the main shaft 11. The groove 46 is defined by first and second wall surfaces sometimes referred to as third and fourth wall surfaces indicated by the reference numerals 61 and 62, respectively, and describes a helical path in a counterclockwise direction with the shaft 11. The first or third wall surface 61 meets with the circumference of the shaft 11 at a first point 63 and defines a first or third groove angle indicated by the reference numeral 64 with a tangent 65 to the shaft 11 which is drawn through said first point 63. The second or fourth wall surface 62 meets with the circumference of the shaft 11 at a second point 67 and defines a second or fourth groove angle indicated by the reference numeral 68 with a tangent 69 to the shaft 11 which is drawn through said second point 67. The first or third groove angle 64 of the groove 46 is at all times larger than the second or fourth groove angle 68 of the groove 46. The first or third wall surface 61 of groove 46 at all times faces the clockwise direction of rotation of the main shaft 11 and the second or fourth wall surface of the groove 46 at all times faces opposite the clockwise direction of rotation of the main shaft 11.

The groove 47 on the second end portion of the main shaft 11 is defined by first and second wall surfaces indicated by the reference numerals 71 and 72, respectively, and described a helical path in a counterclockwise direction with the shaft 11. The first wall surface 71 meets with the circumference of the shaft 11 at a first point 73 and defines a first groove angle indicated by the reference numeral 74 with a tangent 75 to the shaft 11 which is drawn through said first point 73. The second wall surface 72 meets with the circumference of the shaft 11 at a second point 77 and defines a second groove angle indicated by the reference numeral 78 with a tangent 79 to the shaft 11 which is drawn through said second point 77. The first groove angle 74 of the groove 47 is at all times larger than the second groove angle 78 of the groove 47. The first wall surface 71 of groove 47 at all times faces the clockwise direction of rotation of the main shaft 11, and the second wall surface 72 of groove 47 at all times faces opposite the clockwise direction of rotation of the main shaft 11. The groove 48 located on the second end portion of the main shaft 11 is defined by first and second wall surfaces indicated by the reference numerals 81 and 82, respectively, and describes a helical path in a clockwise direction with the shaft 11. The first wall surface 81 meets with the circumference of the shaft 11 at a first point 83 and defines a first groove angle indicated by the reference numeral 84 with a tangent 85 to the shaft 11 which is drawn through said first point 83. The second wall surface 82 meets with the circumference of the shaft 11 at a second point 87 and defines a second groove angle indicated by the reference numeral 88 with a tangent 89 to the shaft 11 which is drawn through said second point 87. The first groove angle 84 of the groove 48 is at all times larger than the second groove angle 88 of the groove 48. The first wall surface 81 of the groove 48 at all times faces the counterclockwise direction of rotation of the main shaft 11, and the second wall surface 82 of the groove 48 at all times faces opposite the counterclockwise direction of rotation of the main shaft 11.

Upon rotation of the main shaft 11, the lubricant 28 will be transmitted from the lubricant reservoir 14 to the first end portion of the main shaft 11 by the wick 19. The action of the wick could be described as that of capillary action. The rotation of the main shaft 11 in a counterclockwise direction will cause the first wall surface 51 of the groove 45 to move the lubricant 28 in an axial direction toward the second end portion of the main shaft 11. The second wall surface 62 of the groove 46 will tend to transport the lubricant in a reverse direction, but the quantity that the groove 46 transports in this direction will be of a smaller magnitude than the quantity transported in the direction of the second end portion of the shaft 11 by the groove 45. The net result is a transportation of lubricant in the direction of the second end portion 24 of the shaft 11. This counterclockwise direction of rotation will cause the first wall surface 81 of the groove 48 located on the second end portion of the shaft 11 to transport the lubricant 28 from the well or third portion 15 of the shaft 11 in the same direction as it is transported by groove 45. There will also be a tendency for the second wall surface 72 of the groove 47 to transport lubricant in the direction which is opposite to the direction of transportation by groove 48. The quantity transmitted in this direction, however, will be of a smaller magnitude than the quantity transported by the groove 48.

When the lubricant transmitted along the main shaft 11 has reached the slot 38 in the brass washer 37 which is located at the end surface 39 of the bearing 13, the lubricant will be caused to travel down the slot 38 in the brass washer 37 to the passageway 40 between the hollow shield 22 and the bearing 13. The lubricant will flow by the force of gravity back to the lubricant reservoir 14.

If the direction of rotation of the main shaft 11 is reversed or changed from the counterclockwise direction of rotation to a clockwise direction of rotation, the first wall surface of the groove 46 will cause the lubricant 28 to be transmitted in a direction toward the second end portion of the main shaft 11. The second wall surface 52 of the groove 45 will tend to transport lubricant in an opposite direction, but the quantity of lubricant transmitted in this opposite direction will be of a smaller magnitude than that transmitted by the first wall surface of the groove 46 in the direction toward the second end portion of the main shaft 11. The net result is the transportation of lubricant in the direction of the second end portion 24. This clockwise direction of rotation will cause the first wall surface of the groove 47 located on the second end portion of the main shaft 11 to transmit the lubricant 28 from the well or third portion 15 of the shaft 11 in the same direction as the first wall surface of the groove 46. The second wall surface of the groove 48 will have a tendency to transport lubricant in a direction which is opposite to the direction in which the first wall surface of the groove is tending to transport it. The quantity transported by the second wall surface of the groove 48 will be of a much smaller magnitude than the quantity transported by the first wall surface of the groove 47.

When the lubricant transmitted along the main shaft 11 has reached the slot 38 in the brass washer 37 located at the end surface 39 of the bearing 13, the lubricant will be caused to flow down the slot 38 into the passageway 40 between the hollow shield 22 and the bearing 13. The lubricant will be caused, by the force of gravity, to flow along this passageway and into the lubricant reservoir 14.

Thus, it will be readily apparent that regardless of the direction of rotation of the main shaft 11, lubricant will be transmitted from the point of contact of the wick 19 on the main shaft 11 and from the well 15 to the first and second bearing portions of the bearing 13.

Tests have shown that lubricant will be transmitted to the bearing 13 without the utilization of the slot 27; but that with the use of the slot 27, a greater quantity of lubricant is transmitted and the lubricating action of the bearing is facilitated to a much greater extent.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In combination a cylindrical shaft, having first and second end portions and a third central portion capable of rotation in either a clockwise or a counterclockwise direction, support means for said shaft comprising, first and second bearing portions, and supply means to supply a lubricant to said shaft at said first end portion, said shaft having on said first end portion a first and a second groove spirally disposed therealong and annularly spaced from each other, said first groove being defined by a first and a second wall surface and describing a helical path in a clockwise direction upon the surface of the shaft, said first wall surface of said first groove meeting the circumference of said shaft at a first point and defining a first groove angle with a tangent to said shaft passing through said first point and said second wall surface of said first groove meeting the circumference of said shaft at a second point and defining a second groove angle with a tangent to said shaft passing through said second point, said first groove angle being larger than said second groove angle, said first wall surface facing the counterclockwise rotation of said shaft and said second wall surface facing opposite the counterclockwise rotation of said shaft, said second groove being defined by a first and a second wall surface and describing a helical path in a counterclockwise direction upon the surface of the shaft, said first wall surface of said second groove meeting the circumference of said shaft at a first point and defining a first groove angle with a tangent to said shaft passing through said first point and said second wall surface to said second groove meeting the circumference of said shaft at a second point and defining a second groove angle with a tangent to said shaft passing through said second point, said first groove angle being larger than said second groove angle, said first wall surface facing the clockwise rotation of said shaft and said second wall surface facing opposite the clockwise rotation of said shaft, said shaft having on said second end portion a first and second groove spirally disposed therealong and annularly spaced from each other, said first groove being defined by a first and a second wall surface and describing a helical path in a counterclockwise direction upon the surface of the shaft, said first wall surface of said first groove meeting the circumference of said shaft at a first point and defining a first groove angle with a tangent to said shaft passing through said first point and said second wall surface of said first groove meeting the circumference of said shaft at a second point and defining a second groove angle with a tangent to said shaft passing through said second point, said first groove angle being larger than said second groove angle, said first wall surface facing the clockwise rotation of said shaft and said second wall surface facing opposite the clockwise rotation of said shaft, said second groove being defined by a first and a second wall surface and describing a helical path in a clockwise direction upon the surface of the shaft, said first wall surface of said second groove meeting the circumference of said shaft at a first point and defining a first groove angle with a tangent to said shaft passing through said first point and said second wall surface of said second groove meeting the circumference of said shaft at a second point and defining a second groove angle with a tangent to said shaft passing through said second point, said first groove angle being larger than said second groove angle, said first wall surface facing the counterclockwise rotation of said shaft and said second wall surface facing opposite the counterclockwise rotation of said shaft, said first bearing portion being adapted to receive said first end portion of said shaft and said second bearing portion being adapted to receive said second end portion of said shaft, said bearing portions having a slot on the inner surfaces thereof and extending axially of the shaft to receive the lubricant transmitted, rotation of said shaft in a clockwise direction causes said first wall surface of said second groove on said first end portion of said shaft to transmit lubricant therealong in said first bearing portion toward said third central portion of said shaft from said supply means at a greater rate than said second wall surface of said first groove transmits lubricant away from said first bearing portion toward said supply means and said clockwise rotation causes said first wall surface of said first groove on said second end portion of said shaft to transmit lubricant therealong in said second bearing portion from said third central portion at a greater rate than said second wall surface of said second groove transmits lubricant away from said second bearing portion toward said third central portion, and rotation of said shaft in a counterclockwise direction causes said first wall surface of said first groove on said first end portion of said shaft to transmit lubricant therealong in said first bearing portion toward said third central portion of said shaft from said supply means at a greater rate than said second wall surface of said second groove transmits lubricant away from said first bearing portion toward said supply means and said counterclockwise rotation causes said first wall surface of said second groove on said second end portion of said shaft to transmit lubricant therealong in said second bearing from said third central portion at a greater rate than said second wall surface of said first groove transmits lubricant away from said second bearing portion toward said third central portion.

2. A system for transmitting a fluid including in combination a shaft and a bearing member, said shaft and said bearing member each having first and second end portions, said shaft mounted within said bearing member and adapted for rotation in either of two rotational directions, said shaft having first and second grooves, said first groove extending in a clockwise direction on the surface of said shaft and being defined by first and second wall surfaces, said second groove extending in a counterclockwise direction on the surface of said shaft and being defined by third and fourth wall surfaces, said first wall surface meeting the periphery of said shaft at a first point and defining a first groove angle with a tangent to said shaft passing through said first point, said second wall surface meeting the periphery of said shaft at a second point and defining a second groove angle with a tangent to said shaft passing through said second point, said first groove angle being larger than said second groove angle, said third wall surface meeting the periphery of said shaft at a third point and defining a third groove angle with a tangent to said shaft passing through said third point, said fourth wall surface meeting the periphery of said shaft at a fourth point and defining a fourth groove angle with a tangent to said shaft passing through said fourth point, said third groove angle being larger than said fourth groove angle, said first and said fourth wall surfaces facing in the same counterclockwise direction and said second and third wall surfaces facing in the same clockwise direction, means for supplying liquid to said first end portion of said shaft, rotation of said shaft in either of said two rotational directions causing liquid to be transmitted from said first to said second end portion of said bearing member.

3. A system for transmitting a fluid including a shaft and a bearing member, said shaft and said bearing member each having first and second end portions, said shaft mounted within said bearing member and adapted for rotation in either of two rotational directions, said shaft having first and second grooves, said first groove extending in a clockwise direction on the surface of said shaft and being defined by first and second wall surfaces, said second groove extending in a counterclockwise direction on the surface of said shaft and being defined by third and fourth wall surfaces, said first wall surface meeting the periphery of said shaft at a first point and defining a first groove angle with a tangent to said shaft passing through said first point, said second wall surface meeting the periphery of said shaft at a second point and defining a second groove angle with a tangent to said shaft passing through said second point, said first groove angle being larger than said second groove angle, said third wall surface meeting the periphery of said shaft at a third point and defining a third groove angle with a tangent to said shaft passing through said third point, said fourth wall surface meeting the periphery of said shaft at a fourth point and defining a fourth groove angle with a tangent to said shaft passing through said fourth point, said third groove angle being larger than said fourth groove angle, said first and said fourth wall surfaces facing in the same counterclockwise direction and said second and third wall surfaces facing in the same clockwise direction, a liquid reservoir, a wick member extending between said liquid reservoir and said first end portion of said shaft whereby liquid is supplied to said first end portion of said shaft, rotation of said shaft in either of said two rotational directions causing liquid to be transmitted from said first to said second end portion of said bearing member, passageway means extending between said second end portion of said bearing member and said liquid reservoir whereby liquid transmitted to said second end portion of said bearing member will be returned to said liquid reservoir.

References Cited in the file of this patent

UNITED STATES PATENTS

| | | |
|---|---|---|
| 202,395 | Atkinson | Apr. 16, 1878 |
| 1,177,217 | Taylor | Mar. 28, 1916 |
| 1,377,866 | White | May 10, 1921 |
| 1,762,373 | Wright | June 10, 1930 |
| 2,522,985 | Bradley | Sept. 19, 1950 |

FOREIGN PATENTS

| | | |
|---|---|---|
| 865,097 | France | May 13, 1941 |